(12) United States Patent
Roman et al.

(10) Patent No.: US 7,041,163 B2
(45) Date of Patent: May 9, 2006

(54) NON-AQUEOUS INKJET INK SET

(75) Inventors: Ronald Roman, Hockessin, DE (US); Hamdy A. Elwakil, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 296 days.

(21) Appl. No.: 10/644,323

(22) Filed: Aug. 20, 2003

(65) Prior Publication Data
US 2004/0187732 A1 Sep. 30, 2004

Related U.S. Application Data

(60) Provisional application No. 60/483,516, filed on Jun. 26, 2003, and provisional application No. 60/458,483, filed on Mar. 28, 2003.

(51) Int. Cl.
 C09D 11/02 (2006.01)
 G01D 11/00 (2006.01)

(52) U.S. Cl. ...................................... 106/31.6; 347/100
(58) Field of Classification Search ................ 106/31.6; 347/100
See application file for complete search history.

(56) References Cited

U.S. PATENT DOCUMENTS

| 3,412,034 A | 11/1968 | Mcintosh et al. |
| 4,341,683 A | 7/1982 | Snelgrove |
| 5,026,427 A | 6/1991 | Mitchell et al. |
| 5,086,698 A | 2/1992 | Wirz |
| 5,104,448 A | 4/1992 | Kruse |
| 5,141,556 A | 8/1992 | Matrick |
| 5,169,436 A | 12/1992 | Matrick |
| 5,698,016 A | 12/1997 | Adams et al. |
| 5,914,178 A | 6/1999 | Sol et al. |
| 5,994,427 A | * 11/1999 | Kappele et al. .............. 523/160 |
| 6,120,589 A | 9/2000 | Bannai et al. |
| 6,160,370 A | 12/2000 | Ohnuma |
| 6,166,104 A | * 12/2000 | Kobayashi ................... 523/160 |
| 6,475,271 B1 | * 11/2002 | Lin ........................ 106/31.27 |
| 6,644,799 B1 | * 11/2003 | Han-Adebekun et al. ... 347/100 |
| 6,750,269 B1 | * 6/2004 | Smith ......................... 523/160 |
| 2001/0003263 A1 | 6/2001 | Johnson et al. |
| 2001/0004871 A1 | 6/2001 | Johnson et al. |
| 2002/0011179 A1 | * 1/2002 | Menzel et al. ........... 106/31.51 |
| 2002/0056403 A1 | 5/2002 | Johnson et al. |
| 2002/0077383 A1 | * 6/2002 | Takao et al. ................ 523/160 |

FOREIGN PATENT DOCUMENTS

| EP | 1 201 719 A1 | 5/2002 |
| WO | WO 02/18154 A1 | 3/2002 |

OTHER PUBLICATIONS

Copy of the International Search Report (PCT/US2004/020418) dated Oct. 26, 2004.

* cited by examiner

Primary Examiner—Mark L. Bell
Assistant Examiner—Veronica F. Faison
(74) Attorney, Agent, or Firm—Bart E. Lerman

(57) ABSTRACT

This invention pertains to an ink set for inkjet printing, in particular to a non-aqueous ink set comprising one or more inks based on certain pigment colorants. The invention also pertains to a method of inkjet printing with this ink set.

19 Claims, No Drawings

NON-AQUEOUS INKJET INK SET

CROSS-REFERENCE TO RELATED APPLICATION

This application claims priority under 35 U.S.C. §119 from U.S. Provisional Application Ser. No. 60/458,483 (filed Mar. 28, 2003), and U.S. Provisional Application Ser. No. 60/483,516 (filed Jun. 26, 2003), both of which are incorporated by reference herein as if fully set forth.

BACKGROUND OF THE INVENTION

This invention pertains to an ink set for inkjet printing, in particular to a non-aqueous ink set comprising one or more inks based on certain pigment colorants. The invention also pertains to a method of inkjet printing with this ink set.

Inkjet printing is a non-impact printing process in which droplets of ink are deposited on print media, such as paper or polymeric substrates, to form the desired image. The droplets are ejected from a printhead in response to electrical signals generated by a microprocessor.

Ink can comprise colorant that is dissolved (dye) or dispersed (pigment) in the ink vehicle. The ink vehicle can be aqueous or non-aqueous and the ink is referred to as aqueous or non-aqueous ink, accordingly.

Aqueous ink is advantageous because water is especially environmentally friendly. There are many applications though where aqueous ink is unsuitable and non-aqueous ink must be used. Many if not most of these non-aqueous ink applications involve printed articles, and particularly printed articles on polymer substrates, which will be exposed to sunlight and the preferred colorants are pigments because of their well-know advantage in fade resistance compared to dyes.

Dispersion of pigment in non-aqueous vehicle is substantially different than dispersion in aqueous vehicle. Generally, pigments that can be dispersed well in water do not disperse well in non-aqueous solvent, and vice versa. Also, the demands of inkjet printing are quite rigorous and the standards of dispersion quality are high. Thus, pigments that may be "well dispersed" for other applications are often still inadequately dispersed for inkjet applications.

There is a need for improved pigment selection for non-aqueous inkjet inks. In particular, there is a need for pigments in non-aqueous ink that provide improved chroma and transparency, while still retaining good resistance to light fade and appropriate hue angle.

SUMMARY OF THE INVENTION

In accordance with one aspect of the present invention, there is provided an inkjet ink set comprise a plurality of non-aqueous, colored, pigmented inks, at least one of which is a yellow ink comprising PY 120 dispersed in a non-aqueous vehicle.

In one preferred embodiment, the ink set comprises at least three different, non-aqueous, colored pigmented inks (CMY), at least one of which is a magenta ink, at least one of which is a cyan ink, and at least one of which is a yellow ink comprising PY 120 dispersed in a non-aqueous vehicle. More preferably, the magenta ink comprises a complex of PV 19 and PR202 (also referred to as PV19 /PR202 ) dispersed in a non-aqueous vehicle. Also preferred is a cyan ink comprising on PB 15:3 and/or PB 15:4 dispersed in a non-aqueous vehicle.

In another preferred embodiment, the ink set comprises a non-aqueous, pigmented black ink, preferably comprising a carbon black pigment dispersed in a non-aqueous vehicle. In another preferred embodiment, the ink set comprises at least four inks (CMYK).

The instant ink set is particularly advantageous because of the desirable combination of chroma, transparency, light fastness and dispersion quality.

The present invention also provides a method for ink jet printing onto a substrate, comprising the steps of:
  A) providing an ink jet printer that is responsive to digital data signals;
  B) loading the printer with a substrate to be printed;
  C) loading the printer with the above-mentioned ink jet ink set
  D) printing onto the substrate using the inkjet ink set in response to the digital data signals.

Preferably, the substrate is a polymeric substrate.

These and other features and advantages of the present invention will be more readily understood, by those of ordinary skill in the art, from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

DETAILED DESCRIPTION OF THE PREFERRED EMBODIMENTS

Colorant

As indicated above, the colorant in the inks of the ink sets of the present invention is a pigment. By definition, pigments do not form (to a significant degree) a solution in the vehicle and must be dispersed.

Traditionally, pigments are stabilized to dispersion by dispersing agents, such as polymeric dispersants or surfactants. More recently though, so-called "self-dispersible" or "self-dispersing" pigments (hereafter "SDP(s)") have been developed. As the name would imply, SDPs are dispersible in a vehicle without dispersants.

As indicated above, the yellow pigment is preferably Color Index pigment PY 120. A commercial example is PV Fast Yellow H2G (Clariant). This pigment also has the advantageous color properties—favorable hue angle, good chroma and light fastness—and disperses well in non-aqueous vehicle.

As also indicated above, the magenta pigment is preferably PV19/PR202. A commercial example is Cinquasia Magenta RT-355-D (Ciba Specialty Chemicals Corporation). The pigment particles are an intimate complex of the PV19 and PR202 species and not simply a physical mixture of individual PV19 and PR202 crystals. This pigment has the advantageous color properties of quinacridone pigments such as PR122—favorable hue angle, good chroma and light fastness—and disperses well in non-aqueous vehicle. In contrast, PR122 pigment does not disperse well under similar conditions.

Preferred cyan pigments include PB 15:3 and PB 15:4.

A preferred black pigment is carbon black.

Other pigments for inkjet applications are also generally well known. A representative selection of such pigments are found, for example, in U.S. Pat. Nos. 5,026,427 5,086,698, 5,141,556, 5,169,436 and 6,160,370, the disclosures of which are incorporated by reference herein for all purposes as if fully set forth. The exact choice of pigment will depend upon color reproduction and print quality requirements of the application.

Dispersants to stabilize the pigments to dispersion are preferably polymeric because of their efficiency. Examples of typical dispersants for nonaqueous pigment dispersions include, but are not limited to, those sold under the trade names: Disperbyk (BYK-Chemie, USA), Solsperse (Avecia) and EFKA (EFKA Chemicals) polymeric dispersants.

Suitable pigments also include SDPs. SDPs for aqueous inks are well known. SDPs for non-aqueous inks are also known and include, for example, those described in U.S. Pat. No. 5,698,016, U.S. Ser. Nos. 2001003263, 2001004871 and 20020056403, the disclosures of which are incorporated by reference herein for all purposes as if fully set forth. The techniques described therein could be applied to the pigments of the present invention.

It is desirable to use small pigment particles for maximum color strength and good jetting. The particle size may generally be in the range of from about 0.005 micron to about 15 microns, is typically in the range of from about 0.005 to about 1 micron, is preferably from about 0.005 to about 0.5 micron, and is more preferably in the range of from about 0.01 to about 0.3 a micron.

The levels of pigment employed in the instant inks are those levels that are typically needed to impart the desired OD to the printed image. Typically, pigment levels are in the range of from about 0.01 to about 10% by weight, based on the total weight of the ink.

Nonaqueous Vehicle

"Nonaqueous vehicle" refers a vehicle that is substantially comprised of a nonaqueous solvent or mixtures of such solvents, which solvents can be polar and/or nonpolar. Examples of polar solvents include alcohols, esters, ketones and ethers, particularly mono- and di-alkyl ethers of glycols and polyglycols such as monomethyl ethers of mono-, di- and tri-propylene glycols and the mono-n-butyl ethers of ethylene, diethylene and triethylene glycols. Examples of nonpolar solvents include aliphatic and aromatic hydrocarbons having at least six carton atoms and mixtures thereof including refinery distillation products and by-products. The solvents may also be comprised in part, or entirely, or polymerizable solvents such as solvents which cure upon application of UV light (UV curable).

Even when no water is deliberately added to the nonaqueous vehicle, some adventitious water may be carried into the formulation, but generally this will be no more than about 2–4%. By definition, the nonaqueous ink of this invention will have no more than about 10%, and preferably no more than about 5%, by weight of water based on the total weight of the nonaqueous vehicle.

Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Also useful are esters, especially acetate esters, of the preceding glycol ethers.

The amount of vehicle in the ink is typically in the range of about 70% to about 99.8%, and preferably about 80% to about 99.8%, based on total weight of the ink.

Other Ingredients

The inks may optionally contain one or more other ingredients such as, for example, surfactants, binders, bactericides, fungicides, algicides, sequestering agents, buffering agents, corrosion inhibitors, light stabilizers, anti-curl agents, thickeners, and/or other additives and adjuvants well-known in the relevant art.

These other ingredients may be formulated into the inks and used in accordance with this invention, to the extent that such other ingredients do not interfere with the stability and jetability of the ink, which may be readily determined by routine experimentation. The inks may be adapted by these additives to the requirements of a particular inkjet printer to provide an appropriate balance of properties such as, for instance, viscosity and surface tension, and/or may be used to improve various properties or functions of the inks as needed.

The amount of each ingredient must be properly determined, but is typically in the range of from about 0.1 to about 15% by weight and more typically about 0.2 to about 10% by weight, based on the total weight of the ink.

Surfactants may be used and useful examples include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants, if used, are typically in the amount of about 0.01 to about 5% and preferably about 0.2 to about 2%, based on the total weight of the ink.

Binders may be also used and can be soluble or dispersed polymer(s), added to the ink to improve the adhesion of a pigment. Examples of polymers that can be used include polyesters, polystyrene/acrylates, sulfonated polyesters, polyurethanes, polyimides and the like. When present, soluble polymer is advantageously used at levels of at least about 0.3%, and preferably at least about 0.6%, based on the total weight of the ink. Upper limits are dictated by ink viscosity or other physical limitations.

Ink Properties

Jet velocity, drop size and stability are greatly affected by the surface tension and the viscosity of the ink. Ink jet inks typically have a surface tension in the range of about 20 dyne/cm to about 60 dyne/cm at 25° C. Viscosity can be as high as 30 cP at 25° C., but is typically somewhat lower. The inks have physical properties compatible with a wide range of ejecting conditions, i.e., driving frequency of the piezo element, or ejection conditions for a thermal head, for either a drop-on-demand device or a continuous device, and the shape and size of the nozzle. The ink set of this invention should have excellent storage stability for long periods so as not clog to a significant extent in an ink jet apparatus. Further, it should not alter the materials of construction of the ink jet printing device it comes in contact with, and be essentially odorless and non-toxic.

Although not restricted to any particular viscosity range or printhead, the inventive ink set, because of the use of nonaqueous inks, is particularly suited to lower viscosity applications such as those required by higher resolution (higher dpi) printheads that jet small droplet volumes, e.g. less than 20 pL. Thus the viscosity (at 25° C.) of the inventive inks and fixer can be less than about 7 cps, is preferably less than about 5 cps, and most advantageously is less than about 3.5 cps.

Substrate

The instant invention is particularly advantageous for printing on polymeric (non-porous) substrates such as polyvinyl butyral interlayer (including 15 and 30 mil thickness); spun bonded polyolefin (e.g. Tyvek®, DuPont); polyvinyl chloride; polyethylene terephthalate; polyester; polyvinyl fluoride polymer, and the like.

A particularly preferred use for the ink sets of the present invention is the decorative printing of polyvinyl butyral interlayers used in safety or architectural glass applications, such as disclosed in commonly owned WO2004/018197 (International Application No. PCT/US2003/026193), filed concurrently herewith, and entitled "Decorative Laminated Safety Glass", which is incorporated by reference herein for all purposes as if fully set forth.

EXAMPLES

Magenta Dispersion Preparation

A magenta dispersion was prepared by mixing 1200 g of Magenta PR202/PV19 pigment (Ciba Cinquasia RT-355-D), 1463 g of Disperbyk 2000 (BYK-Chemie), 2337 g of Dowanol DPM (dipropylene glycol methyl ether) and milling in a 1.5-liter horizontal media mill with 0.6–0.8 mm zirconia media. After milling to the desired endpoint, the media was separated and the dispersion was further diluted with Dowanol DPM to a final pigment concentration of 18.4% by weight. The viscosity was about 36 cps (Brookfield viscometer, 25° C.) and median particle size was 82 nm.

Yellow Dispersion Preparation

A yellow dispersion was prepared by mixing the following ingredients: 125 g of Yellow PY 120 (Clariant PV Fast Yellow H2G), 208 g of Disperbyk 161 (BYK-Chemie), 167 g of Dowanol PMA (propylene glycol methyl ether acetate) and milling in a 250-ml horizontal media mill with 0.6–0.8 mm zirconia media. After milling to the desired endpoint, the media was separated and the dispersion was further diluted with Dowanol PMA to a final pigment concentration of 20.0% by weight. The viscosity was about 26.5 cps (Brookfield viscometer, 25° C.) and median particle size was 132 nm.

Cyan Dispersion Preparation

A cyan dispersion was prepared by mixing 140 g of Cyan PB 15:4 pigment (Sun Sunfast Blue 249-0835), 136 g of Disperbyk 2000 (BYK-Chemie), 9 g of Solsperse 12000 (Avecia), 214 g of Dowanol DPM (dipropylene glycol methyl ether) and milling in a 250-ml horizontal media mill with 0.6–0.8 mm zirconia media. After milling to the desired endpoint, the media was separated and the dispersion was further diluted with Dowanol DPM to a final pigment concentration of 20% by weight. The viscosity was about 23 cps (Brookfield viscometer, 25° C.) and median particle size was 115 nm.

Preparation of Black Pigment Dispersion

A black dispersion was prepared by mixing 157 g of carbon black pigment (Cabot Mogul L), 153 g of Disperbyk 2000 (BYK-Chemie), 191 g of Dowanol DPM (dipropylene glycol methyl ether) and milling in a 250-ml horizontal media mill with 0.6–0.8 mm zirconia media. After milling to the desired endpoint, the media was separated and the dispersion was further diluted with Dowanol DPM to a final pigment concentration of 25% by weight. The viscosity was about 47 cps (Brookfield viscometer, 25° C) and median particle size was 80 nm.

Ink Preparation

The ink formulations were prepared according to the recipe in the following table.

|  | Ink Formulations (weight percent) Color | | | |
|---|---|---|---|---|
|  | Magenta | Yellow | Cyan | Black |
| Magenta Dispersion (7% pigment) | 36.08 | | | |
| Yellow Dispersion (7% pigment) | | 35.23 | | |
| Cyan Dispersion (5.5% pigment) | | | 28.35 | |
| Black Dispersion (7% pigment) | | | | 27.43 |
| Dowanol ® DPM | 0.00 | 0.00 | 28.66 | 29.03 |
| Dowanol ® DPMA (dipropylene glycol methyl ether acetate) | 38.35 | 38.86 | 42.99 | 43.54 |
| Dowanol ® DPnP (dipropylene glycol mono-n-propyl ether) | 25.57 | 25.91 | 0.00 | 0.00 |
| Total | 100.00 | 100.00 | 100.00 | 100.00 |
| Viscosity (Brookfield viscometer, 25° C.) | 4.97 | 4.16 | 3.76 | 5.21 |
| Surface Tension (dynes/cm) | 27.64 | 27.41 | 27.95 | 27.64 |
| Median particle diameter (nm) | 85 | 127 | 95 | 99 |

Printing Tests

An Epson 3000 ink jet printer was equipped with the four inks above and prints were made on various substrates. The substrates included polymeric sheets such as: polyvinyl butyral interlayer (15, 30 ml thickness); Tyvek® JetSmart (DuPont); uncoated polyvinyl chloride; Tedlar® (DuPont); polyethylene terephthalate; and Surlyn® (DuPont).

The jetting performance was good and tests showed the inventive ink set provided very desirable gamut, transparency and light-fastness.

What is claimed is:

1. An inkjet ink set comprising a plurality of non-aqueous, colored, pigmented inks, at least one of which is a yellow ink comprising PY120 dispersed in a non-aqueous vehicle.

2. The inkjet ink set of claim 1, wherein at least one of the inks is a magenta ink comprising a complex of PV19 and PR202 dispersed in a non-aqueous vehicle.

3. The inkjet ink set of claim 1, further comprising at least one non-aqueous, pigmented magenta ink, and at least one non-aqueous, pigmented cyan ink.

4. The inkjet ink set of claim 3, wherein at least one of the inks is a magenta ink comprising a complex of PV19 and PR202 dispersed in a non-aqueous vehicle.

5. The inkjet ink set of claim 3, wherein at least one of the inks is a cyan ink comprising PB 15:3 PB 15:4 dispersed in a non-aqueous vehicle.

6. The inkjet ink set of claim 4, wherein at least one of the inks is a cyan ink comprising PB 15:3 and/or PB 15:4 dispersed in a non-aqueous vehicle.

7. The inkjet ink set of claim 3, further comprising at least one non-aqueous, pigmented black ink.

8. The inkjet ink set of claim 1, wherein the inks have a surface tension in the range of about 20 dyne/cm to about 60 dyne/cm at 25° C., and a viscosity of 30 cP or less at 25° C.

9. The inkjet ink set of claim 1, wherein the inks comprise about 70% to about 99.8% non-aqueous vehicle, and about 0.01 to about 10% pigment, by weight based on the total weight of the ink.

10. A method for ink jet printing onto a substrate, comprising the steps of:

A) providing an ink jet printer that is responsive to digital data signals;

B) loading the printer with a substrate to be printed;

C) loading the printer with an inkjet ink set; and

D) printing onto the substrate using the inkjet ink set in response to the digital data signals, wherein the inkjet ink set comprises a plurality of non-aqueous, colored, pigmented inks, at least one of which is a yellow ink comprising PY120 dispersed in a non-aqueous vehicle.

11. The method of claim 10, wherein the substrate is a polymeric substrate.

12. The method of claim 11, wherein at least one of the inks in the inkjet ink set is a magenta ink comprising a complex of PV19 and PR202 dispersed in a non-aqueous vehicle.

13. The method of claim 11, wherein the inkjet ink set further comprises at least one non-aqueous, pigmented magenta ink, and at least one non-aqueous, pigmented cyan ink.

14. The method of claim 13, wherein at least one of the inks in the inkjet ink set is a magenta ink comprising a complex of PV19 and PR202 dispersed in a non-aqueous vehicle.

15. The method of claim 13, wherein at least one of the inks in the inkjet ink set is a cyan ink comprising PB 15:3 and/or PB 15:4 dispersed in a non-aqueous vehicle.

16. The method of claim 14, wherein at least one of the inks in the inkjet ink set is a cyan ink comprising PB 15:3 and/or PB 15:4 dispersed in a non-aqueous vehicle.

17. The method of claim 13, wherein the inkjet ink set further comprises at least one non-aqueous, pigmented black ink.

18. The method of claim 11, wherein the inks of the inkjet ink set have a surface tension in the range of about 20 dyne/cm to about 60 dyne/cm at 25° C., and a viscosity of 30 cP or less at 25° C.

19. The method of claim 11, wherein the inks of the inkjet ink set comprise about 70% to about 99.8% non-aqueous vehicle, and about 0.01 to about 10% pigment, by weight based on the total weight of the ink.

* * * * *